United States Patent [19]

Lewis et al.

[11] 4,225,826
[45] Sep. 30, 1980

[54] LASER APPARATUS

[75] Inventors: Owen Lewis, Fairport; Stanley Refermat; Thomas A. Almquist, both of Rochester, all of N.Y.

[73] Assignee: The University of Rochester, Rochester, N.Y.

[21] Appl. No.: 875,111

[22] Filed: Feb. 3, 1978

[51] Int. Cl.² ............................................. H01S 3/092
[52] U.S. Cl. ................................ 330/4.3; 331/94.5 T; 350/169
[58] Field of Search .................... 330/4.3; 331/94.5 C, 331/94.5 T; 350/169

[56] References Cited

U.S. PATENT DOCUMENTS

| | | | |
|---|---|---|---|
| 3,361,987 | 1/1968 | De Maria | 330/4.3 |
| 3,525,053 | 8/1970 | Chernoch | 330/4.3 |
| 3,579,130 | 5/1971 | Smiley | 330/4.3 |
| 3,810,041 | 5/1974 | Martin | 330/4.3 |
| 3,863,177 | 1/1975 | Damen et al. | 330/4.3 |
| 3,986,130 | 10/1976 | Soures et al. | 330/4.3 |
| 4,006,431 | 2/1977 | Ross | 331/94.5 P |
| 4,039,962 | 8/1977 | Hughes | 330/4.3 |
| 4,084,883 | 4/1978 | Eastman et al. | 331/94.5 T |

FOREIGN PATENT DOCUMENTS

| | | | |
|---|---|---|---|
| 2292354 | 11/1974 | France | 330/4.3 |
| 2292356 | 6/1976 | France | 330/4.3 |

*Primary Examiner*—Nelson Moskowitz
*Attorney, Agent, or Firm*—Martin Lukacher

[57] ABSTRACT

An active mirror laser amplifier is described having a slab of Nd:glass which is optically pumped through the back face while the laser beam enters the slab through the front face and is reflected by a coating on the back face which reflects the laser beam while transmitting the pumping radiation. The laser beam is amplified as it moves toward the back face and after reflection from the back face as it propagates out and is emitted from the front face. The front face has an anti-reflection coating for the laser beam which coating reflects the pumping radiation. The storage efficiency of the laser is thereby increased and the temperature gradients in the slab are reduced (viz., the temperature profile is smoothed such that distortion of the slab is reduced and high power operation at high repetition rates of the laser pulse is obtainable).

7 Claims, 3 Drawing Figures

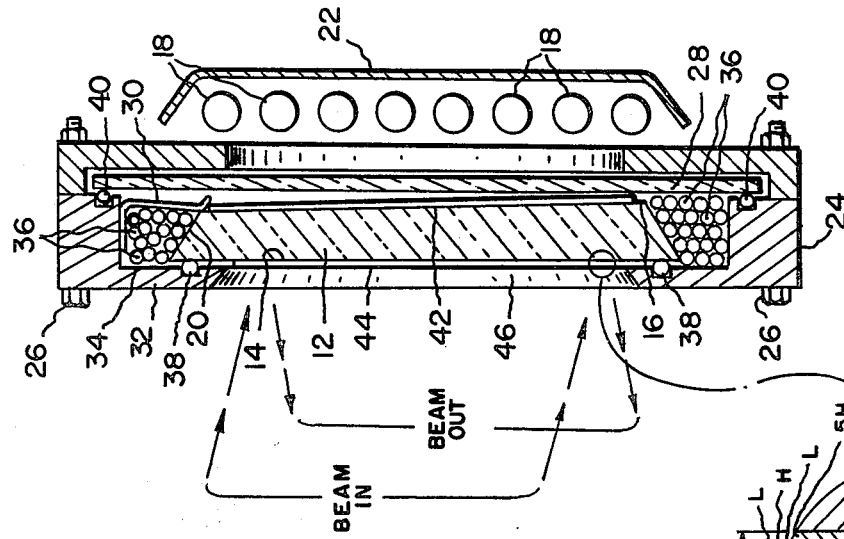
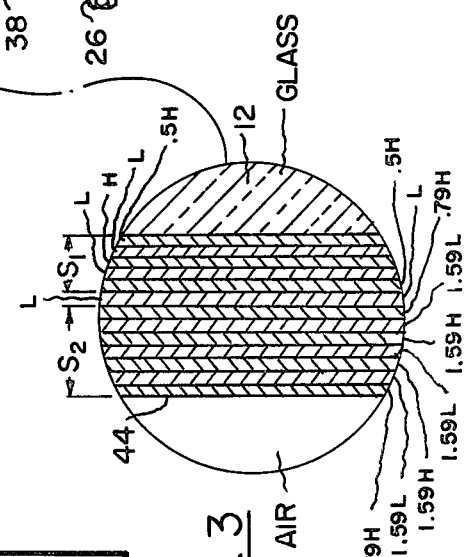
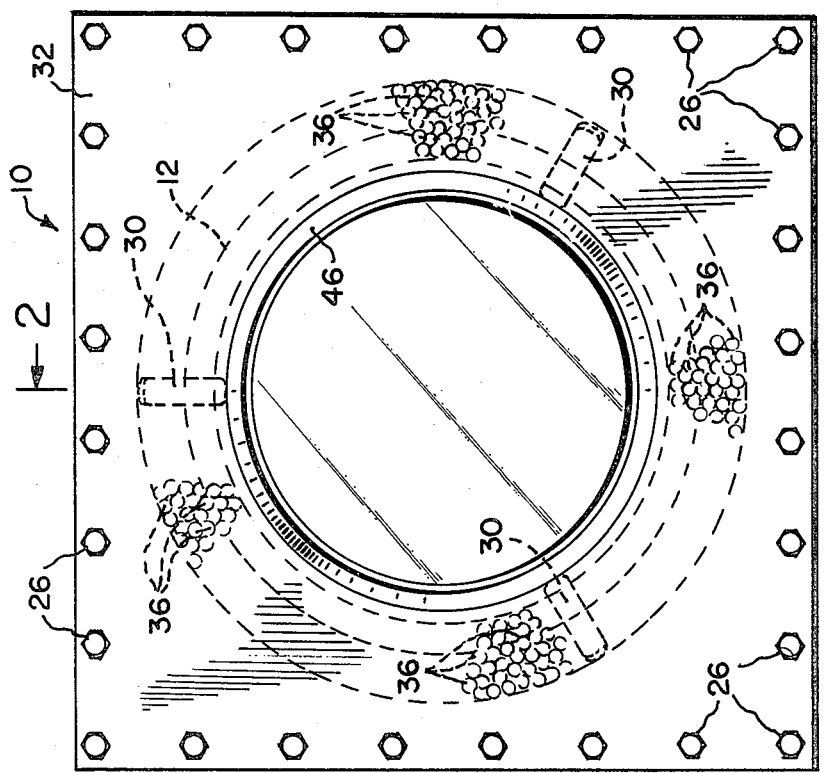
FIG. 1
FIG. 2
FIG. 3

LASER APPARATUS

The present invention relates to laser apparatus and particularly to face-pumped lasers.

The invention is especially suitable for use in lasers of the active mirror type, both in amplifier and oscillator configurations. Such active mirror laser amplifiers and oscillators are high power, large aperture devices which may be used in systems for providing high power laser beams which can be applied to a target containing a nuclear fusion fuel so as to produce fusion reactions. The invention is however adapted generally for use in generating and amplifying laser light for other purposes such as communications and industrial applications.

Face pumped lasers of the active mirror type consist of a disc or slab of active laser material having end surfaces which are large as compared to the distance therebetween across the edge of the slab, i.e., the thickness of the slab is small as compared to the area of its end face. Optical pumping radiation can be applied to the slab through one of the end faces. This face may be referred to as the pump face while the opposite face may be referred to as the front face. The laser beam enters and is emitted at the front face. The pump face has an optical coating which reflects radiation at the wavelength of the laser light and transmits radiation at the pumping wavelengths. The laser beam experiences gain and is amplified both as it moves toward the pump face and after reflection as it propagates back out and is emitted at the front face. For further information respecting face pumped lasers and active mirror lasers, reference may be had to the following U.S. Pat. Nos.: 4,039,962; 3,986,130; 3,679,996; 3,466,569.

Face pumped lasers and particularly the active mirror are high energy devices, which operate to generate and amplify laser beams, usually in pulsed applications, at gigawatt and terawatt power levels. In order to enhance the performance of such lasers it is necessary to make efficient use of the optical pumping energy while at the same time having regard for thermal effects which can cause optical distortion and, even more seriously, destruction of the active laser material.

When the laser is energized by pumping radiation as from flash lamps placed in proximity with the pump face, the pumping radiation enters the slab. The active laser medium absorbs the pump energy over a band of wavelengths depending upon the material and is most absorptive for pumping energy at certain wavelengths (viz., the absorption peaks). For example where the active laser material is neodymium glass (Nd:glass) the pump bands at which the pumping energy is absorbed peak at a number of wavelengths, 0.35, 0.52, 0.58, 0.745, 0.80, and 0.87 microns, which are in the visible or near visible region while the laser beam is in the infrared and in the case of Nd:phosphate glass is at 1.053 microns wavelength. The pump energy is absorbed by the laser material at the pump bands of the neodymium ions therein and converted to stored energy for laser or light amplification at the laser wavelength (1.053 microns).

As the pump light enters the slab of laser material, it is absorbed first near the pump face and there is continually less light available for producing stored energy as the light propagates through the laser glass and out the front face of the slab (viz, the face opposite to the flash lamps). For optimum performance, i.e., to maximize storage efficiency and the gain of the laser, it is desirable to maximize the extraction of all of the useful pumping energy (viz., the energy at the pump bands or absorption wavelengths of the laser material). Techniques heretofore suggested for accomplishing such optimization have been undesirable or ineffective. For example, the thickness of the slab may be increased, in which case more material is available for the absorption and storage of pumping energy. Thick slabs are however undesirable because of long thermal cycling intervals. The slab does not cool quickly (has a long thermalization time). Temperatures can reach levels which are destructive. Thus operation at high repetition rate of the laser pulses can not be obtained and the peak power performance is poor. More pumping energy can be absorbed by increasing the concentration of doping material in the slab, which in the case of Nd:glass involves increasing the concentration of neodymium, usually by adding more $Nd_2O_3$ to the glass in the course of the fabrication of the slab. Increased doping is ineffective since it leads to shortened excited state relaxation times, the net effect of which is inefficient pumping and overall inefficiency of the laser.

It has been discovered in accordance with the invention that the efficiency of storage of the pumping energy can be increased without either increasing the thickness of the slab of laser material or its doping through the use of a coating on the front face of the slab that is an anti-reflection coating for the laser wavelength (viz., highly transmissive to the 1.053 micron laser energy in the case of Nd:phosphate glass) and is reflective to the pumping radiation at certain pump band wavelengths, particularly those which are not substantially absorbed as the pumping radiation propagates between the pump face and the face of the slab. The reflection of the light in these pump bands back into the slab instead of out through the front face of the slab results in an increase of storage efficiency from about 20 to 40% for a typical slab having neodymium doping (1 to 3% by weight) and a thickness of about 2 to 3 cm.

Accordingly, it is a principal object of the present invention to provide improved high power laser apparatus.

It is another object of the present invention to provide an improved face pumped laser and especially a face pumped laser of the type known as an active mirror.

It is a further object of the invention to provide improved face pumped laser apparatus wherein the efficiency of storage of pump energy in the slab of laser material is increased.

It is a still further object of the present invention to provide an improved face pumped laser amplifier having increased gain as a result of enhanced storage of pumping energy in the slab of laser material used in the amplifier.

It is a still further object of the present invention to provide improved face pumped laser apparatus which in operation, even at high repetition rates of the laser pulses, provides a smooth temperature profile throughout the slab of laser material used therein (i.e., where the temperature gradient through the slab is decreased over face pumped laser apparatus heretofore available).

It is a still further object of the present invention to provide improved optically pumped laser apparatus which optimizes the use of pump energy in accordance with the wavelength thereof.

It is a still further object of the present invention to provide face pumped laser apparatus having improved thermal characteristics in operation.

It is a still further object of the present invention to provide improved face pumped laser apparatus wherein temperature gradient dependent optical distortion is reduced.

Briefly described, laser apparatus embodying the invention makes use of a slab of laser material which is adapted to be illuminated by radiation of pumping wavelengths and from which laser light is emitted in response to said pumping radiation at a wavelength different from the pumping wavelengths. The slab has a surface through which the laser light passes and at which the pumping radiation is received after passage through the slab. An anti-reflection coating for radiation at the laser wavelength that reflects radiation at the pumping wavelengths is provided on the surface through which the laser light passes, whereby the efficiency of utilization of the pumping radiation is enhanced without affecting the reception and emission of laser light from the apparatus. The coating utilizes a plurality of thin film layers. The coating is anti-reflective at the wavelength of the laser light but reflective at those wavelengths at which the absorption of the pumping radiation in the slab is enhanced when radiation of these wavelengths is reflected back into the slab from the front face. For Nd:phosphate glass of doping at 1 to 3% and thickness of 2 to 3 cm these wavelengths are suitably about 0.52 and 0.87 microns.

The foregoing and other additional objects and advantages of the invention as well as the presently preferred embodiment thereof will become more apparent from a reading of the following description in connection with the accompanying drawings in which:

FIG. 1 is a plan view of an active mirror laser amplifier embodying the invention;

FIG. 2 is a sectional view of the amplifier shown in FIG. 1, the section being taken along the line 2—2 in FIG. 1; and FIG. 3 is an enlarged fragmentary view showing the optical coating on the front face of the slab of active laser material contained in the amplifier shown in FIGS. 1 and 2.

Referring now to the drawings, there is shown an active mirror laser 10 having a slab 12 of active laser material which in this active mirror is Nd:glass. The slab has a front face 14 and a back face 16. Pumping radiation from a bank of flash lamps 18 illuminates the slab 12 through the back face 16 which may be referred as the pump face of the slab. The front face and the back face 16 are canted with respect to each other at a small angle suitably thirty seconds of arc. In other words the angle between the pump face and a plane parallel to the front face which intersects the plane of the pump face, may suitably be thirty seconds. The edge 20 of the slab is generally frustoconical in shape and forms a side angle suitably of approximately 5° with respect to the front face 14.

The flash lamps 18 may be xenon flash lamps. Water jackets (not shown) surrounding each of the lamps in the bank 18 are provided for cooling the lamps. A reflector 22 around the bank 18 directs the illumination toward the pump face 16. A mounting 24 having two parts, which are held together by bolts 26, sandwiches a plate 28 of heat resistant glass which serves as a blast shield. A set of spring clips 30 disposed 120° apart positions the slab 12 against an "O" ring 38 or bumper pads (not shown) on the inside of the front wall 32 of the mounting 24. A chamber 34 which is cylindrical in shape surrounds the edge 20 of the slab. Balls 36 preferably of glass having the same refractive index as the slab, fill the chamber and support the slab in the mounting 24. The chamber 34 and a gap between the plate 28 and the pump face 16 of the slab 12 are sealed as by the "O" rings 38 and 40 and filled with cooling fluid which may be circulated therethrough. This fluid most desirably has the same index of refraction as the slab material. The arrangement provides support for the slab so that it is mounted with minimum distortion as well as suppression of parasitic emissions through the edge of the slab. These emissions are decoupled and deposited in the volume of absorbing balls 36 and cooling fluid. The mounting arrangement is the subject matter of U.S. patent application Ser. No. 738,500, filed Nov. 3, 1976 in the name of Owen Lewis and Edmund M. Stogran, and assigned to the same assignee as this application.

A coating 42 on the pump face 16 similar to coatings used in other active mirror lasers transmits the pump radiation from the flash lamps 18. In the case of xenon lamps, the wavelength of the pumping radiation covers the region from about 0.35 microns to 0.90 microns. The laser material of the slab 20 has absorption wavelengths in pump bands within this region. The peaks of these absorption pump bands for Nd:phosphate glass having doping of about 2% $Nd_2O_3$, such as Owens-Illinois type EV-2 or Kigre type Q-88 are at about 0.35, 0.52, 0.58, 0.745, 0.80 and 0.87 microns. The pump energy absorbed in the laser material excites the material to generate, and in the illustrated application, to amplify laser light which enters the front face 14 in a beam (schematically indicated in the drawing by the legend "beam in"). The laser light of the input beam in the case of the illustrated Nd:glass laser slab is amplified as coherent light at a wavelength of 1.053 microns. This laser light may be in pulses at very high power levels in the gigawatt or terawatt region. The beam leaves and is emitted from the slab through the front face after reflection by the coating 42 on the pump face. The coating 42 transmits the pump illumination while reflecting the laser light. Due to the large amount of energy provided by the flash lamps some reflection of the flash lamp light at the pump face can be tolerated. Reflection of the laser light at the front face can not be tolerated. Accordingly, it is necessary that the reflectivity of the air glass interface at the front face 14 of the slab 12 be reduced to a very low level. Desirably less than 0.2% of the laser light should be reflected at the front face 14.

The efficiency of the active mirror is maximized by reducing the reflection of the incoming and outgoing laser light (the outgoing laser light is denoted schematically by the dash lines and the legend "beam out"). The efficiency of the active mirror 10 is also enhanced and maximized in accordance with the invention by increasing the extraction (absorption) of the flash lamp energy at the wavelength of the pump bands at about 0.52 and 0.87 microns which are not substantially absorbed in their first pass through the slab 12 by causing the radiation at these pump band wavelengths to be reflected at the front face and to propagate back through the slab 12. A coating 44 on the front face 14 provides both the property of reducing the reflection of the laser light and reflecting these pump band wavelengths (i.e., in this example with peaks at 0.52 and 0.82 microns) which cover these absorption bands (viz., those peaking at 0.52 and 0.87 microns). In other words, the coating 44 is both an anti-reflection coating at the laser light wavelength, and a reflector coating at the wavelengths of a plurality of the pump bands which are not substantially absorbed during the first pass through the slab.

The inclination of the front face 14 with respect to the pump face 16 of the slab 12 and the edges 20 of the slab also enhance the operation of the active mirror by reducing the chance that a reflector laser cavity which might produce spurious emissions would be formed. The angle between the front face 14 and the pump face 16 also discriminates against any residual front face reflections by directing such reflections outside of the aperture of the amplifier (viz., to the side rather than along the path of the input or output laser beam).

Typically, the slab 12 may have a diameter of about 20 centimeters and a thickness of about 2.5 centimeters. The aperture provided inside the perimeter of the opening 46 in the front wall 32 of the mounting 24 may suitably be about 17 centimeters.

The coating 44 consists of a plurality of thin film dielectric material layers. The coating 44 is shown in FIG. 3. It consists of a stack $S_1$ which is reflective over the 0.52 micron pump band while having about the same optical admittance as the uncoated glass of the slab 12 at the laser wavelength 1.053 microns. The coating 44 also has another stack $S_2$ which is reflective over the 0.87 micron band (the peak of its reflectivity is at about 0.825, but the reflectivity extends to substantially cover the 0.87 micron pump band). This stack $S_2$, in concert with stack $S_1$ provides an anti-reflection coating at the laser wavelength (i.e., 1.053 microns). The intervening L layer acts to prevent the adjacent H layers from forming an unwanted region of transmission. The coating 44 may be defined by the relationship A [0.79H 1.59L(1.59H 1.59L)$^2$ 0.79H] L [0.5H LHL 0.5H] G A and G respectively represent the air and the glass of the slab 12 at the front face. L. and H represent quarter wavelength optical thickness of different thin film material at a certain wavelength. The coefficients are the multiples of these optical thicknesses and define the thickness of each layer. Where no specific multiplier is mentioned, the multiplier is unity.

The L'$_s$ have an index of refraction $n_L$ equal to 1.46 and an optical thickness ($n_L t_L$) of a quarter wavelength at 0.52 microns. The H'$_s$ have an index of refraction $n_H$ of 2.05 and an optical thickness ($n_H t_H$) of a quarter wavelength at 0.52 microns. The materials of the films may be fused silica ($SiO_2$) in the case of the L films and tantalum pentoxide ($Ta_2O_5$) in the case of the H films.

From the foregoing description it will be apparent that there has been provided improved laser apparatus and especially improved face pumped lasers. While an active mirror laser has been described it will be appreciated that other types of active mirrors using other laser materials within the scope of the invention, will undoubtedly suggest themselves to those skilled in the art. Accordingly, the foregoing description should be taken as illustrative and not in a limited sense.

What is claimed is:

1. Laser apparatus comprising
   a slab of active laser material adapted to be illuminated by pumping radiation at pumping wavelengths in a band of wavelengths and from which laser light is emitted in response to said pumping radiation at a wavelength different from said pumping wavelengths,
   said slab having a first surface through which said laser light passes and at which said pumping radiation is received after passage through said slab,
   said slab having a second surface opposite to said first surface through which said pumping radiation passes and at which said laser light is received after passage through said slab,
   a coating on said second surface which is substantially totally transmissive of said pumping radiation in said band of pumping wavelengths and is substantially totally reflective of radiation of said laser light wavelength,
   an anti-reflection coating on said first surface substantially totally transmissive of radiation at said laser light wavelength and substantially totally reflective of radiation only at certain of said pumping wavelengths at which said pumping radiation is not substantially absorbed during a single passage through said slab.

2. The invention as set forth in claim 1 wherein said laser material is neodymium glass, said laser wavelength is 1.053 microns, and said band of pumping wavelengths extends from 0.35 to 0.88 microns with said certain of said pumping wavelengths being 0.52 and 0.87 microns.

3. The invention as set forth in claim 1 wherein said first and second surfaces are different ones of a pair of major surfaces of said slab which are opposed to each other, said second surface being disposed to receive and emit said laser radiation, and optical pumping means located opposite to said second of said slab surfaces.

4. The invention as set forth in claim 3 wherein said optical pumping means is a bank of Xenon flash lamps.

5. The invention as set forth in claim 1 wherein said anti-reflection coating comprises a plurality of thin films, which define stacks which are reflective at said certain of said pumping wavelengths while being anti-reflective at said laser light wavelength.

6. The invention as set forth in claim 3 wherein said major surfaces are canted with respect to each other, and said edge is tapered to define an interior angle with one of said major surfaces which is less than 90°.

7. The invention as set forth in claim 6 further comprising a mount for said body defining a chamber with the edge of said body surrounding said edge, balls of the same material as said body filling said chamber and supporting said body in said mount.

* * * * *